United States Patent [19]
Baynes

[11] Patent Number: 4,628,896
[45] Date of Patent: Dec. 16, 1986

[54] BARBECUE GRILL WITH HORIZONTALLY-SHIFTABLE GRID

[75] Inventor: William R. Baynes, Perry County, Ill.

[73] Assignee: Turco, Inc., DuQuoin, Ill.

[21] Appl. No.: 778,693

[22] Filed: Sep. 23, 1985

[51] Int. Cl.⁴ ............................................. A47J 37/04
[52] U.S. Cl. ................................. 126/25 R; 126/333; 126/334; 99/393; 99/400
[58] Field of Search ................... 99/393, 400; 126/333, 126/334, 218, 9 R, 25 R, 41 R

[56] References Cited

U.S. PATENT DOCUMENTS

| | | | |
|---|---|---|---|
| 2,816,538 | 12/1957 | Miller et al. | 126/25 R |
| 3,103,160 | 9/1963 | Forniti et al. | 99/339 |
| 3,503,324 | 3/1970 | Gmeiner | 99/393 |
| 3,610,225 | 10/1971 | Schwantes | 126/25 R |
| 3,673,948 | 7/1972 | Albright | 99/355 |
| 4,526,158 | 7/1985 | Lee | 126/9 R |

FOREIGN PATENT DOCUMENTS

1253209  1/1961  France .................. 126/334

*Primary Examiner*—Samuel Scott
*Assistant Examiner*—Allen J. Flanigan

[57] ABSTRACT

A barbecue grill makes it possible to effect quick and easy extinguishing of any flames that could develop as drops of fat fell into the heating chamber of that grill, by having a grid which normally holds meat in position over that heating chamber but which can be shifted horizontally to move that meat away from that heating chamber, and thereby keep further drops of fat from falling into that heating chamber. When the flames subside, as they will quickly do, that grid can be shifted to shift the meat back into position over the heating chamber to permit further cooking of that meat. Also, the barbecue grill enables a person to use his or her hands in placing all kinds of meat on the grid by permitting that grid to be shifted horizontally away from the heating chamber whenever any meat is to be placed on it. Further, the grill enables a user to shift the grid, and the meat thereon, away from the heating chamber whenever that user wishes to test, turn or remove that meat. In addition, the meat-supporting grid can be disposed wholly in register with the heating chamber, wholly out of register with that heating chamber, or in any intermediate position to enable all of the meat to receive full heat from that heating chamber, to enable none of that meat to receive heat from that heating chamber, or to enable just some of that meat to receive heat from that heating chamber.

20 Claims, 12 Drawing Figures

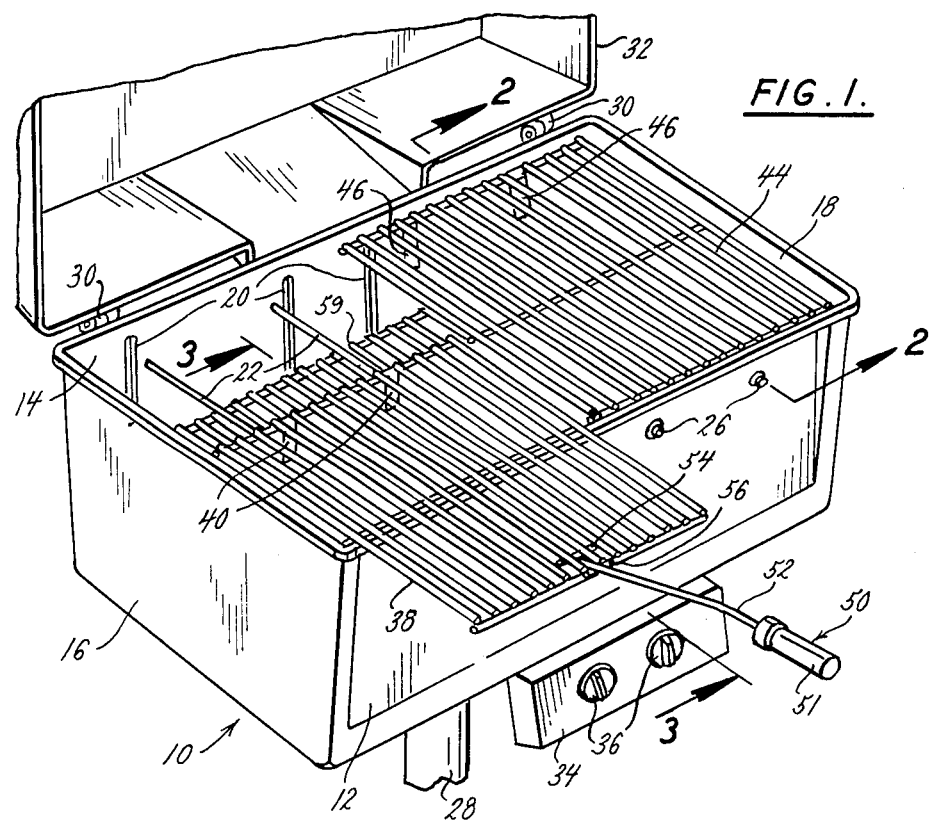
FIG. 1.
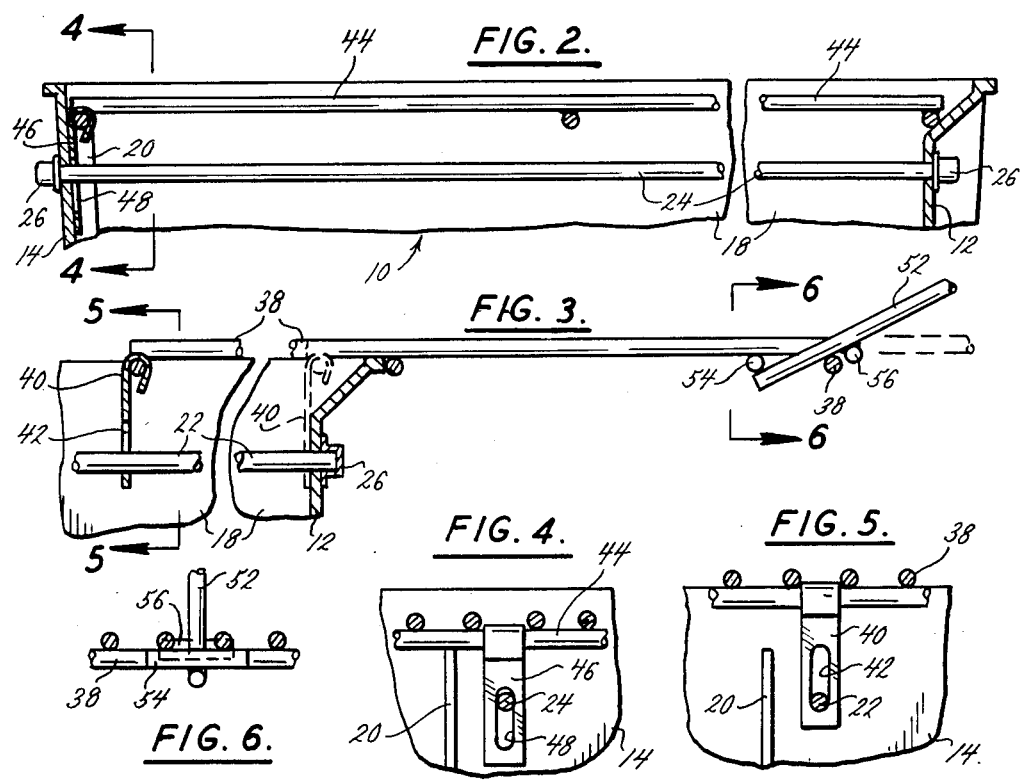
FIG. 2.
FIG. 3.
FIG. 4.
FIG. 5.
FIG. 6.

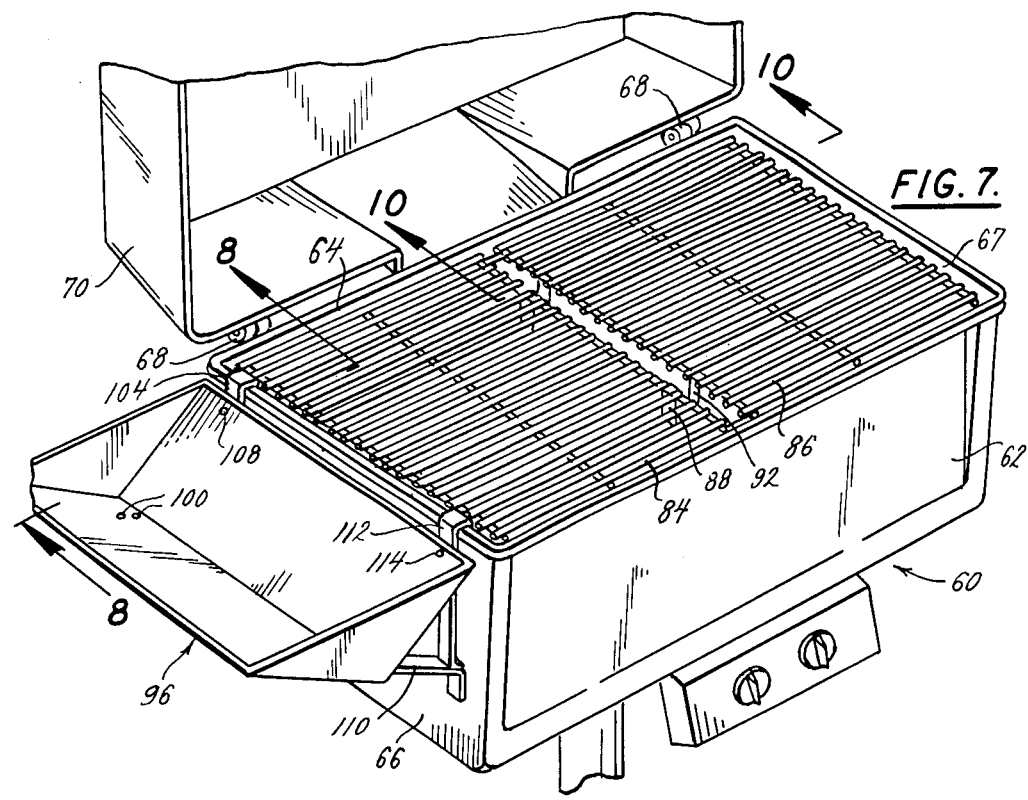
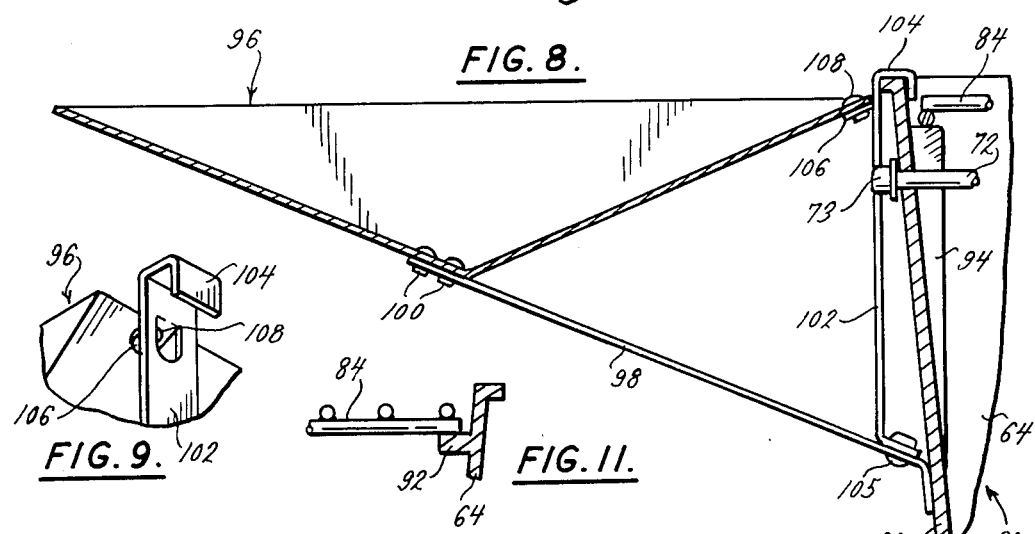
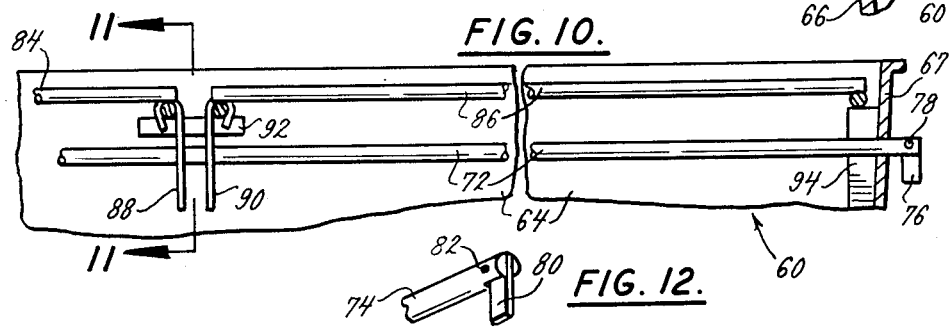

BARBECUE GRILL WITH HORIZONTALLY-SHIFTABLE GRID

BACKGROUND OF THE INVENTION

Meat that is being cooked on a barbecue grill frequently exudes drops of fat which fall into the heating chamber of that grill; and those drops of fat become ignited by contacting the hot coals or the hot lava rocks in that heating chamber. The resulting flames can interfere with proper cooking of the meat; and those flames tend to perpetuate themselves by sustaining or increasing the rate at which the drops of fat are exuded by the meat. As a result, those flames can sometimes be very difficult to extinguish.

SUMMARY OF THE INVENTION

The present invention provides a barbecue grill which makes it possible to effect quick and easy extinguishing of any flames that might develop as drops of fat fell into the heating chamber. That barbecue grill facilitates prompt extinguishing of any such flames by having a grid which normally holds meat in position over the heating chamber of that grill but which can be shifted horizontally to move that meat away from that heating chamber, and thereby keep further drops of fat from falling into that heating chamber. When those flames subside, as they will quickly do, that grid can be shifted to shift the meat back into position over the heating chamber of the grill to permit further cooking of that meat. It is, therefore, an object of the present invention to provide a barbecue grill with a grid that normally holds meat in position over the heating chamber of that grill but which can be shifted to shift that meat horizontally away from that heating chamber to effect quick and easy extinguishing of any flames that might be caused by drops of fat falling into that heating chamber.

In cooking with a barbecue grill, it is customary to get the heating chamber quite hot before the cooking of the meat is begun. The resulting high temperatures of the meat-supporting grid, and of the adjacent air, force the user of the grill to use a fork, spatula or other culinary tool to hold the meat as it is placed in position on that grid. However, some users of barbecue grills find it difficult to attain the desired placement of some kinds of meat on a grid unless they can use their hands to place that meat on that grid. The present invention enables a person to use his or her hands in placing all kinds of meat on the grid of a barbecue grill by permitting that grid to be shifted horizontally away from the heating chamber whenever any meat is to be placed on it. Also, the present invention enables a user of the grill to shift the grid, and the meat thereon, away from the heating chamber whenever that user wishes to test, turn or remove that meat. As a result, the present invention makes it possible to position, test, turn and remove meat with greater ease, precision, comfort and safety than has heretofore been possible. It is, therefore, an object of the present invention to provide a barbecue grill with a grid that can be shifted away from the heating chamber of that grill to facilitate easy, precise, safe and comfortable handling of the meat to be cooked on that grid.

The meat-supporting grid, of the barbecue grill provided by the present invention, can be disposed wholly in register with the heating chamber of that grill, wholly out of register with that heating chamber, or in any intermediate position. This is desirable because, at any given time, it enables all of the meat to receive full heat from the heating chamber, enables none of that meat to receive heat from that heating chamber, or enables just some of that meat to receive heat from that heating chamber. As a result, a user of the barbecue grill provided by the present invention can, during a given barbecuing session, cook some meat so it is rare, cook other meat so it is medium, and cook still other meat so it is well-done. Also, he can recurrently shift the grid away from, and then back into position over, the heating chamber to slow down the rate of cooking; and he can shift that grid away from the heating chamber to enable some kinds of meat to attain the amount of "setting" that is desired. It is, therefore, an object of the present invention to provide a barbecue grill with a grid that can be disposed wholly in register with the heating chamber of that grill, wholly out of register with that heating chamber, or in any intermediate position.

The grid of the barbecue grill provided by the present invention will be in a substantially-horizontal position whenever it overlies the heating chamber of that grill; and it also will be in a substantially-horizontal position whenever it is displaced away from that heating chamber. This is desirable; because it permits food to remain in position on the grid as that grid is moved from its normal cooking position to a position wherein it is displaced from the heating chamber. It is, therefore, an object of the present invention to provide a barbecue grill with a grid which is in a substantially-horizontal position whenever it is disposed in register with the heating chamber of that grill, and which also is in a substantially-horizontal position whenever it is displaced from that heating chamber.

Other and further objects and advantages of the present invention should become apparent from an examination of the drawing and accompanying description.

In the drawing and accompanying description, two preferred embodiments of the present invention are shown and described but it is to be understood that the drawing and accompanying description are for the purpose of illustration and do not limit the invention, and that the invention will be defined by the appended claims.

BRIEF DESCRIPTION OF THE DRAWING

In the drawing,

FIG. 1 is a perspective view of part of a barbecue grill that is made in accordance with the principles and teachings of the present invention, and it shows one of the food-supporting grids of that grill in its normal position, shows another of the food-supporting grids in displaced position, and shows part of a lower grid which supports lava rocks;

FIG. 2 is a broken sectional view, on a larger scale, which is taken along a plane indicated by the line 2—2 in FIG. 1;

FIG. 3 is a broken sectional view, on the scale of FIG. 2, which is taken along a plane indicated by the line 3—3 in FIG. 1, and it shows an intermediate position of the grid by solid lines and a fully-displaced position of that grid by dotted lines;

FIG. 4 is a sectional view, on the scale of FIG. 2, which is taken along a plane that is indicated by the line 4—4 in FIG. 2;

FIG. 5 is a sectional view, on the scale of FIG. 2, which is taken along a plane that is indicated by the line 5—5 in FIG. 3;

FIG. 6 is a sectional view, on the scale of FIG. 2, which is taken along a plane that is indicated by the line 6—6 in FIG. 3;

FIG. 7 is a perspective view of part of a second barbecue grill that is made in accordance with the principles and teachings of the present invention;

FIG. 8 is a sectional view, on a larger scale, which is taken along a plane indicated by the line 8—8 in FIG. 7;

FIG. 9 is a perspective view, on the scale of FIG. 8, of the upper end of a part of a tray and of one of the supporting struts therefor;

FIG. 10 is a sectional view, on the scale of FIG. 8, which is taken along a plane indicated by the line 10—10 in FIG. 7;

FIG. 11 is a sectional view, on the scale of FIG. 8, which is taken along a plane indicated by the line 11—11 in FIG. 10; and FIG. 12 is a perspective view of one end of an elongated rod which is mounted within the barbecue grill of FIG. 7.

DETAILED DESCRIPTION OF THE PREFERRED EMBODIMENTS

Referring to FIGS. 1—6 in detail, the numeral 10 generally denotes the heating chamber of a barbecue grill. That heating chamber has a front wall 12, a rear wall 14, a left-hand end wall 16 and a right-hand end wall 18. The numeral 20 denotes four vertically-directed ribs which are formed at the inner face of the rear wall 14. That heating chamber and those ribs can be of standard and usual design; and they are not, per se, parts of the present invention.

The numeral 22 denotes elon9ated smooth-surfaced rods which have the front and rear ends thereof disposed within aligned openings in the front and rear walls 12 and 14 of the heating chamber 10. The numeral 24 denotes further elongated smooth-surfaced rods which have the front and rear ends thereof disposed within aligned openings in the front and rear walls 12 and 14 of that heating chamber. Top-hat fasteners 26 are pressed or screwed onto the projecting front and rear ends of the rods 22 and 24 to hold those rods in assembled relation with the heating chamber 10. As indicated particularly by the drawing, the rods 22 and 24 are close to the top of the heating chamber 10; and they are substantially horizontal.

The numeral 28 denotes a post which underlies and supports the heating chamber 10. The numeral 30 denotes hinges adjacent the opposite ends of the upper edge of the rear wall 14 of that heating chamber; and those hinges rotatably support a cover 32. The numeral 34 denotes a panel which depends downwardly adjacent the lower edge of the front wall 12 of the heating chamber 10; and knobs 36 project forwardly from that panel. Those knobs control gas valves, not shown, which are supported by the panel 34 and which can selectively supply gas to burners, not shown, within the heating chamber 10.

The numeral 44 denotes a grid which is shown as having three transversely-extending and fourteen longitudinally-extending bars. Those bars are welded or otherwise suitably secured together to provide a sturdy open-type grid of standard and usual configuration and appearance. That grid is dimensioned so the rearmost transversely-extending bar thereof can rest on the tops of the two righthand ribs 20 and so the forwardmost transversely-extending bar can rest on an upwardly and forwardly inclined upper portion of the front wall 12, as shown particularly by FIG. 2. That grid differs from prior grids for barbecue grills in having two retainers 46 that are provided with vertical slots 48. Those retainers are flat throughout the major portions of their lengths; but they have the upper ends thereof bent around the rearmost transversely-extending bar of the grid 44 to maintain themselves in assembled relation with that grid. The elongated slot 48 in one of the retainers 46 is telescoped over one of the rods 24 before that rod is assembled with the heating chamber 10; and the vertical slot in the other of those retainers is telescoped over the other of those rods before that other rod is assembled with that heating chamber.

In one preferred embodiment of the present invention, the height of each retainer 46 is two (2) inches, the width of each of those retainers is one half (½) of an inch, and each slot is five-eighths (⅝) of an inch high and five-sixteenths (5/16) of an inch wide. The rods 24 are one-fourth (¼) of an inch in diameter; and hence the slots 48 are wide enough to permit easy movement of the retainers 46 along the lengths of the rods 24, and also to permit easy vertical movement of those retainers relative to those rods. Those slots are so positioned in the retainers 46 that the tops of those slots will be disposed small fractions of an inch above the tops of the rods 24 whenever the rearmost transversely-extending bar of grid 44 is resting on the upper ends of the ribs 20, as shown by FIG. 4. In the preferred embodiment of the present invention, the retainers 46 and the grid 44 tend to move as a unit, although those retainers can be rotated relative to that grid.

The numeral 38 denotes a grid which is essentially identical to the grid 44; but the retainers for the grid 38 are denoted by the numerals 40, and the slots in those retainers are denoted by the numerals 42. Those slots are telescoped over the rods 22 before those rods are assembled with the heating chamber 10. Whenever the grid 38 is in its normal position, it will be at the level of the grid 44 in FIG. 2, it will have the rearmost transversely-extending bar thereof resting on the two lefthand most ribs 20, and it will have the forwardmost transversely-extending bar thereof resting on the upwardly and forwardly inclined upper portion of the front wall 12.

The numeral 59 denotes a grid which is located below the levels of the grids 38 and 44; and that grid is intended to support lava rocks which will be heated by burning gas. The grid 59 is of standard and usual design, it is located in the position that is normally occupied by grids which support lava rocks, it is supported in the manner in which such grids are customarily supported, and it will perform the functions that are normally performed by such grids. The grid 59 and its supports are not, per se, parts of the present invention.

The numeral 50 generally denotes a lifting tool which has an elongated rod 52 projecting forwardly from a handle 51. That rod has a cross rod 54 secured to the upper surface thereof, and it has a shorter cross rod 56 secured to the under surface thereof. The cross rod 54 is dimensioned so it can be set vertical and moved downwardly between adjacent longitudinally-extending bars of either of the grids 38 and 44. However, that cross rod and the cross rod 56 are made long enough to span the distance between at least two longitudinally-extending rods of either of the grids 38 and 44 whenever those cross rods are horizontal, as indicated particularly by FIG. 6.

To move either of the grids 38 and 44, of the barbecue grill of which the heating chamber 10 is a part, the user can dispose the lifting tool 50 with the cross rod 54 thereof vertical and aligned with the space between two adjacent longitudinally-extending bars of either of those grids, can move that cross rod downwardly below the bottoms of those adjacent bars, and can then rotate the handle 51 of that tool until that cross rod is parallel to the transversely-extending bars of that grid. At such time, the cross rod 56 will overlie the two adjacent longitudinally-extending bars, or will abut the upper front portion of the forwardmost transversely-extending bar, and the cross rod 54 will underlie those two adjacent longitudinally-extending bars. The user can then grip the handle 51 of the lifting tool 50 and raise the front portion of the grid 38 or 44 far enough to enable the lower end of the elongated rod 52 of that tool to clear the upper edge of the front wall 12; but that raising movement will still leave the grid substantially horizontal. The user can then pull horizontally on the lifting tool 50 to shift the grid 38 or 44 forwardly along the lengths of the rods 22 or 24, respectively, until a desired area of that grid is displaced wholly forwardly of the heating chamber 10. The slots 42 and 48, respectively, in the retainers 40 and 46 will permit free forward shifting of the grid 38 or 44 to any desired position of those retainers along the lengths of those rods. When the grid has been shifted to a position desired by the user, the lifting tool 50 can be lowered to lower the longitudinally-extending bars of the grid onto the upper edge of the front wall 12, as indicated by FIG. 3. If, at that time, the weight of the grid and of any food thereon tends to make that grid rotate in the clockwise direction in FIG. 3, the lower ends of the slots 42 or 46 will engage the rods 22 or 24, respectively, to hold the grid in substantially-horizontal position, as indicated by FIGS. 3 and 5. On the other hand, if the weight of the grid and of any food thereon tends to make that grid rotate in the counter clockwise direction in FIG. 3, the upper ends of those slots will engage those rods to hold the grid in substantially-horizontal position. This means that whether a grid is in its fully displaced, or in a partially-displaced, position, and whether food is on the front or rear area thereof, the retainers 40 or 46 will hold that grid substantially horizontal.

The heating chamber 10 will be heated by gas which is admitted by appropriate manipulation and setting of the knobs 36. Once that heating chamber has attained the desired temperature, food can be placed on the forwardly displaced grids 38 and 44 without any risk of the user having his or her hands exposed to flame, or even to uncomfortable heat. Thereafter, the lifting tool 50 can be used to shift the grids 38 and 44 into position in register with the left-hand and right-hand halves of the heating chamber 10. If some of the food is to be cooked so it is rare, that food can be placed on the forward portion of the grid 38 or 44, and that portion can be recurrently shifted forwardly so it is not in register with any portion of the heating chamber 10. Other portions of the food which are to be cooked so they are medium or well done would be disposed toward the middle and rear portions, respectively, of those grids; and they would be given longer exposures to the heat which is developed within the heating chamber. Preferably the portions of the food which are to be cooked so they are medium will be placed on the middle of the grid 38 or 44; and that food will not be moved into register with any portion of the heating chamber until after the portions of the meat which are to be well done have had an initial cooking due to their exposure to the heat in the heating chamber. Subsequently, the portions of the food which are to be cooked so they are medium will be moved into register with the heating chamber; and, finally, the portions of the food which are to be cooked so they are rare will be moved into position over the heating chamber. In this way, the various items of food can be cooked to the desired degrees of "doneness"; and yet all of them can be finished at the same time.

Whenever the food is to be tested for the degree of cooking, is to be turned, or is to be removed from the grid, the lifting tool 50 can be used to raise the forward end of that grid and move it forwardly until the food is out of register with the heating chamber. At such time, safer, easier and more comfortable access can be had to the food than is possible where that food is continuously in position over the heating chamber.

If, at any time, drops of fat from the food on either of the grids fall into the heating chamber and become ignited, the user need only use the lifting tool 50 to shift that grid forwardly until that food is out of register with the heating chamber 10. The resulting cessation of the introduction of drops of fat into that heating chamber will effect prompt and easy extinguishing of fat-induced flames; and also will cool the food sufficiently to halt or minimize the exudation of drops of fat. Consequently, the grid can be returned to its normal position in register with the heating chamber 10 to effect resumption of proper cooking of the food.

The grids 38 and 44 are substantially horizontal whenever they are in register with the heating chamber 10, as shown particularly by FIG. 2. Those grids also are substantially horizontal whenever they are in a fully-displaced position or in a partially-displaced position, as shown by FIG. 3. This is desirable; because it enables those grids to be shifted between their normal positions above the heating chamber into any of a multitude of desired displaced positions while leaving those grids substantially horizontal—and hence able to support food. Even where the lifting tool 50 has to be raised upwardly to raise the lower portion of the rod 52 thereof above the upper edge of the front wall 12, the grid 38 or 44 will be sufficiently horizontal to keep food thereon from shifting or sliding off of that grid.

Referring particularly to FIGS. 7-12, the numeral 60 generally denotes the heating chamber of a second barbecue grill that is made in accordance with the principles and teachings of the present invention. That heating chamber has a front wall 62, a rear wall 64, a left-hand end 66, and a right-hand end 67. Hinges 68 at the upper edge of the rear wall 64 rotatably support a cover 70 for the heating chamber 60.

The numeral 72 denotes an elongated, smooth-surfaced rod which has the ends thereof disposed within aligned openin9s in the end walls of the heating chamber 60. That rod is comparable to the rods 22 and 24 of FIGS. 1-6, but that rod extends longitudinally, rather than transversely, of the heating chamber 60. The numeral 73 denotes a top hat fastener which can be pressed, or screwed, onto the left-hand end of the rod 72. The right-hand end of that rod has a slot therein; and a detent 76 has one end thereof secured within that slot by a pivot 78. The numeral 74 denotes a second elongated, smooth-surfaced rod which is essentially identical to the rod 72. The left-hand end, not shown, of the rod 74 will have a top hat fastener pressed, or screwed, onto it; and the right-hand end of that rod has a slot therein. One end of a detent 80 is held within that slot by a pivot 82.

The detent 76 can be rotated ninety degrees in the counterclockwise direction in FIG. 10 to be coaxial with the rod 72; and that will be done whenever the rod 72 is to be assembled with, or separated from, the heating chamber 60. That rod can be separated from that heating chamber whenever that heating chamber is to be cleaned out or the lava rocks are to be replaced. At all other times, the detent 76 will be in the position shown by FIG. 10, wherein it will prevent accidental separation of the rod 72 from the heating chamber 60. Similarly, the detent 80 will be made coaxial with the rod 74 whenever that rod is to be assembled with, or separated from, the heating chamber 60. At all other times, that detent will be in the position shown by FIG. 12, wherein it will prevent accidental separation of that rod from that heating chamber. The sections which are taken along the lines 8—8 and 10—10 in FIG. 7 are close to the rear wall 64 of the heating chamber 60, thereby showing that the rod 72 is close to that rear wall. The rod 74 is close to the front wall 62 of that heating chamber.

The numeral 84 denotes a grid which is similar to the grid 38 of FIGS. 1-6; but the uppermost bars of the grid 84 are parallel to the long axis of the heating chamber 60, whereas the uppermost bars of the grid 38 are transverse of the long axis of the heating chamber 10. The numeral 86 denotes a grid which is substantially identical to the grid 84. A retainer 88, which preferably is identical to the retainer 40, is secured to the right-hand most lower bar of the grid 84 adjacent the rear end of that bar. A similar retainer, not shown, is secured to the front end of that bar. The numeral 90 denotes a retainer which preferably is identical to the retainer 46; and that retainer is secured to the left-hand most lower bar of the grid 86 adjacent the rear end of that bar. A similar retainer, not shown, is secured to the front end of that bar. The retainers 88 and 90 have slots, not shown, therein which are comparable to the slots 42 and 48, respectively, in the retainers 40 and 46; and those slots accomodate the rods 72 and 74. Also, those slots are large enough to permit free and ready shifting of the grids 84 and 86 longitudinally relative to the rods 72 and 74, and hence longitudinally relative to the heating chamber 60.

The heating chamber 60 of FIGS. 7-12 differs primarily from the heating chamber 10 of FIGS. 1-6 in having the elongated rods 72 and 74 extend parallel to the long axis of that heating chamber, and in having the grids 84 and 86 move parallel to that long axis. The heating chamber 60 also differs from the heating chamber 10 in having a boss 92 at the approximate center of the upper portion of the rear wall 64 thereof, and in having ribs 94 at the inner faces of the end walls 66 and 67. The boss 92 and the upwardly and forwardly inclined upper portion of the front wall 62 can support the ends of the adjacent lower bars of the grids 84 and 86 whenever those grids are in the normal positions shown by FIG. 7. The endmost lower bars of those grids can be supported by the ribs 94 whenever those grids are in the normal positions shown by FIG. 7. If desired, however, the boss 92 and the ribs 94 could be deleted; and, in that event, the rearmost upper bars of the grids 84 and 86 could be supported by ribs such as the ribs 20 which are usually provided at the rear of the heating chamber of a barbecue grill. The front ends of the grids 84 and 86 could be supported by the upwardly and forwardly inclined upper portion of the front wall 62 of the heating chamber 60, whenever those grids are in the normal positions shown by FIG. 7.

Whenever it is desirable to shift the grid 84 away from the normal position shown by FIG. 7, the lifting tool 50 of FIGS. 1, 3 and 6 will be used to raise the left-hand end of that grid, and then pull that grid lengthwise along the rods 72 and 74. The retainer 88 and its counterpart will permit such ready movement, and will thereafter act to support the right-hand end of that grid in any moved position of that grid. Similarly, whenever it is desired to shift the grid 86 away from the normal position of FIG. 7, the lifting tool 50 can be used to raise the right-hand end of that grid, and then pull that grid lengthwise along the rods 72 and 74. When the grids 84 and 86 are to be returned to the normal positions shown by FIG. 7, the lifting tool 50 will again be used to lift the outer ends of those grids, but will be used to push those grids lengthwise of the rods 72 and 74.

The numeral 96 generally denotes a tray or receptacle which has a V-shaped bottom and vertically-directed end walls. That tray is made so it can hold liquids, and hence can be used to catch and hold any sauces or liquids which are used to baste or otherwise treat food that is supported on the grid 84, when that grid has been shifted lengthwise into position above that tray. That tray also can be used to catch and hold any drops of molten fat which may drip from food on the grid 84, when that grid has been shifted lengthwise into position above that tray.

The numeral 98 denotes an inclined strut which has one end thereof fixedly secured to the underside of the tray 96 by rivets 100, and which has the other end thereof bent to bear against the left-hand end wall 66 of the heating chamber 60. A strut 102, with an inverted J-shaped upper end 104, has the lower end thereof fixedly secured to the strut 98 by a rivet 105. The upper end of the strut 102 has an ear 106 bent outwardly from it, and a rivet 108 fixedly secures that ear to an upper portion of the tray 96. The numeral 110 denotes a strut which preferably is identical to the strut 98; and the upper end of that strut is fixedly secured to the bottom of the tray 96 by rivets, not shown. The lower end of the strut 110 is bent to bear against the left-hand end wall 66 of the heating chamber 60. The numeral 111 denotes a strut which preferably is identical to the strut 102; and that strut has an inverted J-shaped upper end 112. An ear, not shown, in the upper end of the strut 111 is fixedly secured to the tray 96 by a rivet 114.

The inverted J-shaped upper ends 104 and 112 of the struts 102 and 111 are dimensioned to neatly fit over the upper edge of the end wall 66 of the heating chamber 60. Also, the strut 98 and the strut 110 are dimensioned so the top of the tray 96 will be essentially horizontal, whenever the J-shaped inverted ends 104 and 112 are fitted over the upper edge of the end wall 66 and the lower ends of the struts 98 and 110 bear against lower portions of that end wall. As a result, a user of the tray 96 need only fit the inverted J-shaped ends 104 and 112 over the upper edge of the end wall 66, and that tray will automatically be in position to catch and hold any sauces or basting or other fluids that are applied to the food. The inverted J-shaped upper ends 104 and 112 are thin enough so they do not interfere with the positioning of the grid 84 on the ribs 94 at the inner face of the end wall 66, as shown by FIG. 8. Also, those inverted J-shaped ends are thin enough so they do not keep the grid 84 from being substantially horizontal in any position wherein that grid is displaced to the left of the normal position shown by FIG. 7.

The end wall 67 is essentially identical to the end wall 66, and hence the tray 96 can be set in position adjacent the end wall 67. As a result, the user of the barbecue grill shown in FIG. 7 can baste or otherwise treat the food on the grid 84 or on the grid 86 by properly positioning the tray 96.

Trays which are similar to the tray 96 could be supported by the front wall 12 of the heating chamber 10 of FIG. 1. Because that front wall has an upwardly and forwardly inclined upper portion, the inverted J-shaped upper ends of the struts 102 and 107 would have to be made so they fitted downwardly inside the front wall 12 to provide a positive, although releasable, securement between the tray and that front wall. For example, the inverted J-shaped ends of the struts 102 and 111 could be made so they had inclined portions that paralleled the upwardly and forwardly inclined upper portion of the front wall 12, and also had vertically-directed portions which extended downwardly below the lower limit of that upwardly and forwardly inclined upper portion. In that event, the front lower bars of the grids 38 and 44 would rest on the inverted J-shaped ends of the struts 102 and 111 whenever the tray 96 was mounted adjacent the front wall 12.

The invention is shown as being incorporated into the heating chambers of gas-fired barbecue grills. However, that invention also can be incorporated into a barbecue grill which is heated by charcoal or other consumable fuel. In fact, the invention is particularly useful with barbecue grills wherein the heat is supplied by burning charcoal or other consumable fuel; because the temperatures in the heating chambers of such barbecue grills cannot be regulated as readily as can the temperatures within the heating chambers of gas-fired barbecue grills. In those instances where the food tends to cook more rapidly then desired, because of the intense heat from a charcoal fire or from a fire due to some other consumable fuel, the rate of heating of the food can be retarded by recurrently shifting the grids out of, and then back into, register with the heating chamber of the barbecue grill.

The drawing shows two elongated, smooth-surfaced rods beneath each grid; and that is the preferred number of rods to be disposed beneath each grid. However, if desired, more or fewer rods could be used disposed beneath any of the grids. The open-type grids which are shown in the drawing are the preferred form of grids in most barbecue grills. However, the present invention is not limited to use with such grids; because that invention can be used with any grids to which retainers can be secured and which can have the free ends thereof lifted to enable those grids to be shifted.

The top-hat fasteners that are shown in the drawing are useful; but other fasteners could be used. Similarly, the detents 76 and 80 are useful; but other fasteners could be used. The detents 76 and 80 are, however, preferred because they make it possible to assemble the rods 72 and 74 with, and to separate those rods from, the heating chamber 60 without any need of tools.

Whereas the drawing and accompanying description have shown and described a preferred embodiment of the present invention it should be apparent to those skilled in the art that various changes may be made in the form of the invention without affecting the scope thereof.

What I claim is:

1. A barbecure grill which has a heating chamber, a grid on which food can be placed for cooking, and supporting means which hold said grid in assembled relation with said heating chamber throughout the time said barbecure drill is used to cook food, said supporting means being adapted to support said grid in a first position above said heating chamber to enable food thereof to be cooked by heat from said heating chamber, said supporting means also being adapted to support said grid in a second position wherein at least the greater part of said grid is displaced from said heating chamber, said supporting means confining said grid for movement along an essentially-straight line whenever said grid is moved from said first position to said second position and vice versa, and said suporting means having a portion thereof continuously overlying said heating chamber whether said grid is in said first or second position or is being moved from said first position to said second position and vice versa.

2. A barbecure grill as claimed in claim 1 wherein said supporting means includes an elongated support that is secured to and overlies at least a part of said heating chamber and a retainer that is secured to said grid and that is confined by said elongated support, and wherein said retainer moves with said grid whenever said grid is moved from said first position to said second position and vice versa.

3. A barbecue grill as claimed in claim 1 wherein said grid is substantially-horizontal and at a predetermined level whenever it is in position above said heating chamber, and wherein said supporting means holds said grid substantially-horizontal and close to said predetermined level whenever any portion of said grid is displaced from said heating chamber.

4. A barbecure grill as claimed in claim 1 wherein said part of said grid is moved over an upper edge of said heating chamber whenever said grid is moved from said first position to said second position and vice versa, and wherein said grid rests upon said upper edge of said heating chamber so said upper edge of said heating chamber serves as part of said supporting measn whenever said grid is displaced from said heating chamber.

5. A barbecue grill which has a heating chamber, a grid on which food can be placed for cooking, and supporting means which support said grid in position above said heating chamber to enable food thereon to be cooked by heat from said heating chamber, said supporting means also being adapted.to support said grid in a position wherein at least a part of said grid is displaced from said heating chamber, said supporting means including an elongated support that is secured to said heating chamber and a retainer that moves with said grid, and said retainer having a slot therein which accomodates said elongated support and which permits free and easy movement of said retainer along the length of said elongated support.

6. A barbecue grill as claimed in claim 1 wherein said supporting means includes an elongated support that is secured to and overlies at least a part of said heating chamber and a retainer that is secured to and moves with said grid and that is confined by said elongated support, wherein said retainer is adjacent one edge of said grid, and wherein said retainer and said elongated support can help support said grid in a plurality of positions in which said grid is at least partially displaced from said heating chamber.

7. A barbecure grill which has a heating chamber, a grid on which food can be placed for cooking, and supporting means which support said grid in position above said heating chamber to enable food thereon to be cooked by heat from said heating chamber, said supporting means also being adapted to support said grid in a position wherein at least a part of said grid is displaced from said heating chamber, said supporting means includes an elongated support that is secured to said heating chamber and a retainer that moves with said grid, wherein said retainer has a slot therein which accomodates said elongated support and which permits free and easy movement of said retainer along the length of said elongated support, wherein the top of said slot engages said elongated support whenever said grid is in a displaced position and the adjacent portion of said grid tends to move downwardly, and wherein the bottom of said slot engages said elongated support whenever said grid is in a displaced position and an opposite portion of said grid tends to move downwardly.

8. A barbecue grill which has a heating chamber, a grid on which food can be placed for cooking, and supporting means which hold said grid in assembled relation with said heating chamber throughout the time said barbecue grill is used to cook food, said supporting means being adapted to support said grid in a first position above said heating chamber to enable food thereon to be cooked by heat from said heating chamber, said supporting means also being adapted to support said grid in a second position wherein at least the greater part of said grid is displaced from said heating chamber, said supporting means confining said grid for movement along an essentially-straight line whenever said grid is moved from said first position to said second position and vice versa, said supporting means limiting vertical movement of an adjacent portion of said grid relative to said heating chamber in every moved position of said grid, said supporting means permitting limited tilting of said grid in all moved positions of said grid, and said supporting means being separable from said grid and from said heating chamber when said barbecue grill is not being used to cook food.

9. A barbecue grill as claimed in claim 8 wherein said supporting means permits a portion of said grid, which is remote from said supporting means, to be raised and lowered relative to other portions of said grid and also relative to said heating chamber, and wherein said supporting means can be selectively secured to or separated from said heating chamber without any need of tools.

10. A barbecue grill which has a heating chamber, a grid on which food can be placed for cooking, and supporting means which hold said grid in assembled relation with said heating chamber throughout the time said barbecue grill is used to cook food, said supporting means being adapted to support said grid in a first position above said heating chamber to enable food thereon to be cooked by heat from said heating chamber, said supporting means also being adapted to support said grid in a second position wherein at least the greater part of said grid is displaced from said heating chamber, said supporting means confining said grid for movement along an essentially-horizontal path whenever said grid is moved from said first position to said second position and vice versa, and a receptacle releasably secured to said heating chamber to underlie said grid whenever said grid is in said second position, wherein said receptacle receives and holds basting liquid, sauce of the like which drips from food that overlies said receptacle while resting upon said part of said grid that is displaced from said heating chamber, and wherein said grid can be moved from said first position to said second position and vice versa while said receptacle is secured to said heating chamber.

11. A barbecue grill as claimed in claim 1 wherein said heating chamber has front wall and a rear wall, wherein a portion of said grid rests upon and is supported by an upper edge of said front wall of said heating chamber, whereby said upper edge of said front wall of said heating chamber serves as part of said supporting means whenever said grid is displaced from said heating chamber, and wherein said grid is shiftable forwardly and rearwardly relative to said rear wall of said heating chamber.

12. A barbecue grill as claimed in claim 1 wherein said heating chamber has a first side wall and a second side wall, wherein a portion of said grid rests upon and is supported by an upper edge of said first side wall of said heating chamber, whereby said upper edge of said first said side wall of said heating chamber serves as part of said supporting means whenever said grid is displaced from said heating chamber, and wherein said grid is shiftable sideways relative to said first said side wall of said heating chamber.

13. A barbecue grill as claimed in claim 1 wherein said supporting means includes elongated rods that are selectively removable from said heating chamber when said barbecue grill is not being used to cook food, and wherein retainers that are secured to said grid normally engage said elongated rods to confine said grid for said essentially straight-line movement as said grid is moved from said first position to said second position and vice versa.

14. A barbecue grill as claimed in claim 1 wherein said grid overlies a receptacle for basting liquid, sauce or the like whenever said grid is in said second position, and wherein said receptacle receives and holds basting liquid, sauce or the like which drips from food that overlies said receptacle while resting upon said part of said grid that is displaced from said heating chamber.

15. A barbecue grill as claimed in claim 1 wherein said supporting means includes elongated rods, wherein said elongated rods are normally held against accidental separation from said heating chanber but are readily separable from said heating chamber when said barbecue grill is not being used to cook food, and wherein retainers that are secured to said grid normally engage said elongated rods to confine said grid for said essentially straight-line movement as said grid is moved from said first position to said second position and vice versa.

16. A barbecue grill that has a heating chamber, a grid on which food can be placed for cooking, a receptacle that is releasably securable to the heating chamber of said barbecue grill to receive and hold basting liquid, sauce or the like and that comprises a bottom and walls which form a liquid-holding space, and holding means that releasably engage a portion of said heating chamber to releasably hold said receptacle so said receptacle extends outwardly from said heating chamber, said grid being selectively disposable in a first position wherein it is over said heating chamber or in a second position wherein at least the greater portion thereof overlies said receptacle, said grid being movable along an essentially-horizontal path between said first and second positions, said grid being mounted so it is close to the top of said heating chamber whenever it is in said first position and is close to the top of said receptacle when it is in said second position.

17. A barbecue grill and receptacle as claimed in claim 16 wherein said holding means holds the top of said receptacle close the level of the top of said heating chamber and wherein said receptacle is dimensioned to underlie substantially all of said grid.

18. A barbecure grill and receptacle as claimed in claim 16 wherein said portion of said heating chamber which is engaged by said holding means is a wall of said heating chamber, and wherein said wall of said heating chamber helps support said grid whenever said grid is in said second position and thereby has said portion thereof overlying said receptacle.

19. A barbecue grill and receptacle as claimed in claim 16 wherein said barbecue grill has a cover which can be moved into a first position wherein it overlies and is in register with said heating chamber or into a second position wherein it is out of register with said heating chamber, wherein said holding means is supported and said grid is supported, at least in part, by an upper edge of said haating chamber whenever said grid is in its second position, and wherein said cover can be moved into its first position even when said grid is in its second position.

20. A barbecue grill that has a heating chamber, a grid on which food can be placed for cooking, a receptacle that is releasably securable to the heating chamber of said barbecue grill to receive and hold basting liquid, sauce or the like and that comprises a bottom and walls which form a liquid-holding space, and holding means that releasably engage a portion of said heating chamber to releasably hold said receptacle so said receptacle extends outwardly from said heating chamber, said grid being selectively disposable in a first position wherein it is over said heating chamber or in a second position wherein at least a portion thereof overlies said receptacle, said receptacle having one edge which is close to said heating chamber and having a second edge which is remote from said heating chamber, said bottom of said receptacle inclining, at least in part, away from said second edge of said receptacle to keep liquids from accumulating within said receptacle adjacent said second edge of said receptacle.

* * * * *